United States Patent
Panoushek et al.

(10) Patent No.: US 6,587,771 B2
(45) Date of Patent: Jul. 1, 2003

(54) VARIABLE FEEDER AND HEADER DRIVE SYSTEM FOR AN AGRICULTURAL HARVESTING MACHINE

(75) Inventors: Dale W. Panoushek, Orion, IL (US); Sam J. Acker, Sturtevant, WI (US); Eric L. Walker, Tremont, IL (US)

(73) Assignee: Case Corporation, Racine, WI (US)

( * ) Notice: Subject to any disclaimer, the term of this patent is extended or adjusted under 35 U.S.C. 154(b) by 0 days.

(21) Appl. No.: 10/002,255

(22) Filed: Nov. 15, 2001

(65) Prior Publication Data
US 2003/0093202 A1 May 15, 2003

(51) Int. Cl.⁷ .................................................. G06F 7/00
(52) U.S. Cl. ........................................................ 701/50
(58) Field of Search ............................. 701/50, 53, 58; 56/10.2 R, 10.2 G, 10.8

(56) References Cited

U.S. PATENT DOCUMENTS

| | | | |
|---|---|---|---|
| 4,142,348 A | 3/1979 | Jordan et al. | 56/10.2 |
| 4,188,772 A | 2/1980 | Jordan et al. | 56/10.2 |
| 4,205,508 A | 6/1980 | Long | 56/10.2 |
| 4,376,298 A | 3/1983 | Sokol et al. | 364/551 |
| 4,430,846 A | 2/1984 | Presley et al. | 56/10.2 |
| 4,967,544 A | 11/1990 | Ziegler et al. | 56/10.2 |
| 5,488,817 A | 2/1996 | Paquet et al. | 56/10.2 |

*Primary Examiner*—Yonel Beaulieu
(74) *Attorney, Agent, or Firm*—John William Stader; A. Nicholas Trausch; Rebecca L. Henkel

(57) ABSTRACT

A system for controlling the speed of a feeder and header drive of a harvesting machine at a varying ratio to ground speed as a function of an operator inputted signal and the ground speed. The system utilizes a sensed ground speed of the harvesting machine, a sensed feeder and header drive speed, and a speed control input from an operator, for controlling a feeder and header drive control for controllably varying the ratio of the feeder and header speed to the ground speed as a function of the operator input and the sensed ground speed.

6 Claims, 3 Drawing Sheets

VARIABLE FEEDER AND HEADER DRIVE SYSTEM FOR AN AGRICULTURAL HARVESTING MACHINE

TECHNICAL FIELD

This invention relates generally to feeder and header drive control systems for agricultural harvesting machines, and more particularly, to a system which allows operator inputs for varying a ratio or proportional relationship of the feeder and header drive speed to the ground speed of the machine, within an operator determinable ground speed range.

BACKGROUND ART

It is well known in the field of agriculture to utilize harvesting machines such as agricultural combines and the like, which are moved over the ground to pick a crop from a plant and separate the marketable portion of the crop from husks, cobs, stems, and leafy matter of the plants and other extraneous material such as weeds, grasses, vines and the like. In this regard, typically at the front of the machine, such agricultural harvesting machines include a header for gathering and picking the crops from the plants, and a feeder which transports the picked crops from the header to a separator, such as one or more rotary thrashing cylinders or the like.

Ordinarily, it is desired to control at least the header and the feeder so as to operate at a speed proportional to the speed of the machine as it moves over the ground such that the header and feeder are able to receive, process and transport the harvested crops encountered during the forward movement. Reference in this regard, Presley et al. U.S. Pat. No. 4,430,846, issued Feb. 14, 1984, to Electro-Hydraulic Controls, Inc.; Ziegler et al. U.S. Pat. No. 4,967,544, issued Nov. 6, 1990, to Deere & Company; and Paquet et al. U.S. Pat. No. 5,488,817, issued Feb. 6, 1996, to Ford New Holland, Inc.

It is also known to control the header and feeder to maintain a minimum speed required for proper receiving and handling of crops when the ground speed of the machine falls below a predetermined level such that the crops are not pushed over by the header or become jammed therein. And, as disclosed in the above-referenced U.S. Pat. No. 4,967,544, it is known to provide an operator selectable ratio of the header and feeder speed to ground speed to accommodate various crop densities.

However, the known apparatus and methods provide for header and feeder speed control at one or more ratios to ground speed which ratios are fixed or constant over a given ground speed range such that the ratio of the header and feeder speed to ground speed at lower ground speeds within the range will be the same as for faster ground speeds within the range.

An observed limitation of apparatus and systems which function in the above-described manner include that for some field and crop conditions, it may be desirable or more efficient to operate the header and feeders at different ratios or proportional speeds to the ground speed throughout the ground speed range for better or more efficient gathering and feeding.

Accordingly, what is sought is a feeder and header drive system for an agricultural harvesting machine which provides greater flexibility and improved automatic speed control to a better matching or coordinating of feeder and header speed to ground speed throughout a range of ground speeds to provide improved and more efficient crop feeding to the separating apparatus of the harvesting machine.

SUMMARY OF THE INVENTION

A system for controlling the speed of a feeder and header drive of a harvesting machine at a varying ratio to ground speed as a function of an operator inputted signal and the ground speed, is disclosed. The system utilizes a sensor for sensing a speed representative of a ground speed of the harvesting machine and outputting a ground speed signal representative thereof; a sensor for sensing a representative speed of the feeder and header drive and outputting a feeder and header speed signal representative thereof; a feeder and header speed control device connected to the feeder and header drive, the feeder and header speed control device being operable for receiving a speed control signal and increasing or decreasing the speed of the feeder and header drive based on or as a function of the speed control signal; an operator input device for receiving an operator input and outputting an operator input signal representative thereof; and a controller for receiving the ground speed signal, the feeder speed signal, and the operator input signal, and outputting a speed control signal to the feeder and header speed control device which will vary a ratio of the speed of the feeder and header drive to the ground speed as a function of the operator input signal and any changes in the ground speed.

BRIEF DESCRIPTION OF THE DRAWINGS

A non-limiting embodiment of the present invention will be described by way of example with reference to the accompanying drawings, in which.

DETAILED DESCRIPTION OF THE INVENTION

Figure 1:
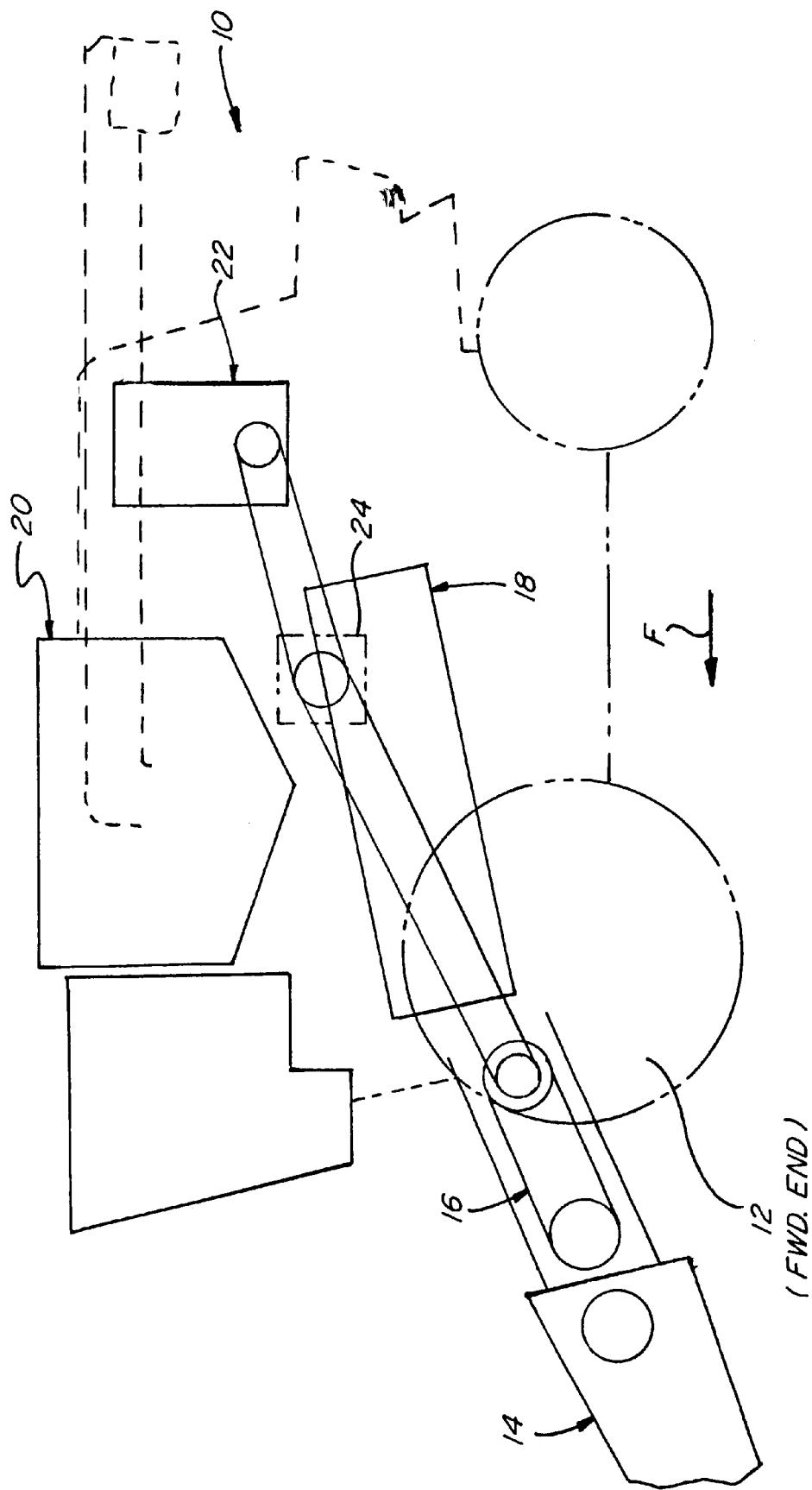
FIG. 1 is a simplified side elevational view of a representative self-propelled agricultural harvesting machine for use with a variable feeder and header drive system according to the present invention.

Referring now to the drawings, in FIG. 1 a conventional self-propelled agricultural harvesting machine movable in a forward direction, denoted by arrow F, for harvesting and separating crops, such as, but not limited to, grains including rice, wheat, soybeans, and corn, is shown. Harvesting machine 10 includes a forward end 12 carrying a conventional header 14 a extending transversely thereacross in close proximity to the ground for gathering and cutting or otherwise separating crop plants or desired portions thereof from root structure thereof and the ground. The crop plants or portions thereof are conveyed by header 14 to a feeder 16 which conveys the plant material to a separator 18 which separates the grains or other crops from the other plant material and foreign material, the crops either being temporarily collected in a bin 20 on machine 10 or discharged to an accompanying wagon or truck (not shown).

Machine 10 is propelled by a conventional power plant such as internal combustion engine 22 and a hydraulic and/or mechanical drive train (not shown) in the well known conventional manner. Engine 22 is also selectably connectable to a feeder and header drive 24 for driving header 14 and feeder 16, drive 24 being a conventional clutch actuated belt drive or other well known suitable drive.

Figure 2:
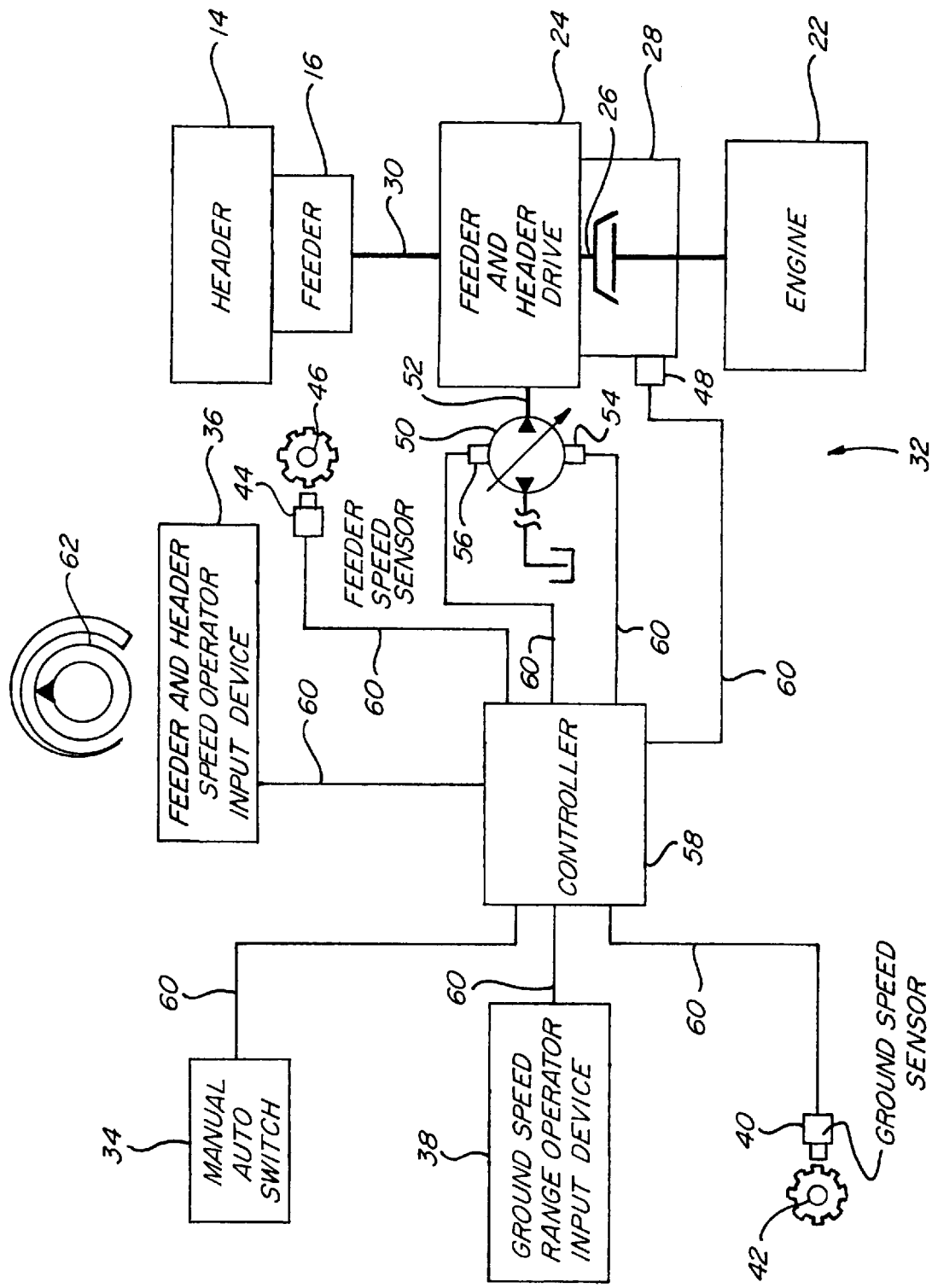
FIG. 2 is a schematic representation of the present system.

Referring also to FIG. 2, feeder and header drive 24 includes an input 26 connected to a clutch 28 operable for selectably connecting drive 24 to engine 22, and an output 30 connected in driving relation to header 14 and feeder 16. Drive 24 also includes a variable ratio belt or gear arrangement (not shown) to allow easily selecting a speed range for header 14 and feeder 16 best suited for a particular header 14 being used and the crop to be harvested in the usual and well known manner.

Harvesting machine 10 includes a variable feeder and header drive system 32 constructed and operable according to the teachings of the present invention which allows operator selection of a header and feeder speed rate of change relative to ground speed rate of change that best meets crop conditions and/or operator preferences. System 32 includes a manual auto switch 34 operable by an operator to select manual operation wherein the operator can directly control the speed of header 14 and feeder 16, or automatic control by system 32. System 32 additionally includes a feeder header speed operator input device 36 which allows an operator to input the desired speed relationship of header 14 and feeder 16 to the ground speed, and a ground speed range operator input device 38 which enables an operator to select a ground speed range in which the feeder and header speed inputs inputted using device 36 are effective. System 32 includes a ground speed sensor 40 operable for sensing or detecting a rotational speed of a drive or axle shaft 42 or other movement representative of the forward ground speed of harvesting machine 10 and outputting a signal representative of the ground speed, and a feeder speed sensor 44 operable for sensing or detecting a rotational speed of a shaft 46 or other element of feeder 16 or header 14 representative of the speed thereof and outputting a signal representative of the speed thereof, both sensors 40 and 44 being conventionally constructed and operable speed sensing or detecting devices. Clutch 28 is a conventional electromechanical clutch and includes an actuator 48 operable for engaging clutch 28 when an appropriate input signal is received from system 32. Feeder and header drive 24 includes a variable displacement hydrostatic pump 50 connected in fluid communication by a fluid connection 52 to a variable pitch and power or fluid motor (not shown) within drive 24, pump drive including an actuator 54 operable for receiving an input signal and correspondingly varying the angle or position of an internal swash plate or other element for varying the displacement of pump 50 and thus fluid flow between pump 50 and the fluid motor for correspondingly varying the rotational speed of output 30 relative to that of input 26 in the well known conventional manner. Pump 50 additionally includes a sensor 56 for sensing or detecting the position of the internal swash plate thereof and outputting a signal representative of the position to provide feedback regarding the operating position of the swash plate or other element for varying the displacement of the pump.

System 32 includes a microprocessor or other processor-based electronic controller 58 connected via conductive paths 60 to switch 34, feeder and header speed operator input device 36, ground speed range operator input device 38, ground speed sensor 40, feeder speed sensor 44, actuator 48, actuator 54, and sensor 56 for receiving signals therefrom and/or sending signals thereto, respectively. With switch 34 switched to an automatic position, controller 58 is operable to receive an input signal from feeder and header speed operator input device 36 and output an output signal to actuator 54 to control pump 50 and thus feeder and header drive 24 such that output 30 will rotate at rotational speeds at a changing ratio relative to the rotational speed of input 26 such that header 14 and feeder 16 will rotate as sensed by sensor 44 at a changing ratio to the ground speed as sensed by sensor 40, the rate of change of the ratio being selectable so as to increase or decrease the rate of feeder and header speed change relative to ground speed change. That is, in this latter regard, input signals from device 36 to controller 58 are received and used by controller 58 to increase the speed of header 14 and feeder 16 at a rate which is greater than a sensed rate of an increase in the ground speed, or lesser than the rate of increase in ground speed, as selected by the operator.

Additionally, using ground speed range operator input device 38, the operator can limit either or both the minimum ground speed and the maximum ground speed at which the header and feeder speed changes are effective. For instance, a minimum ground speed value can be selected such that the header and feeder speed will not fall below a predetermined value when the actual ground speed falls below the minimum value. Conversely, a maximum ground speed value can be selected such that the header and feeder speed will not exceed a predetermined value when the actual ground speed exceeds the maximum ground speed value. Feeder and header speed operator input device 36 can be a device including a knob or other convenient element having an identifiable position or location such as a center position from which the knob or other element can be moved, such as by rotating the knob clockwise and counterclockwise or sliding the element in different directions, to produce distinguishable output signals which vary in some characteristic recognized by controller 58 as a function of the desired degree of change of ratio of feeder and header speed to ground speed. Such varying characteristics can be, for instance, a voltage, an impedance, or a digital value, to name just a few possibilities, a potentiometer including a knob 62 rotatable in the clockwise direction for producing an output signal such as a voltage having a value within a first predetermined range, and rotatable in the counterclockwise direction from a center position for producing an output signal having a value within a second predetermined range different from the first range, being a preferred example of one device usable as device 36.

Figure 3:
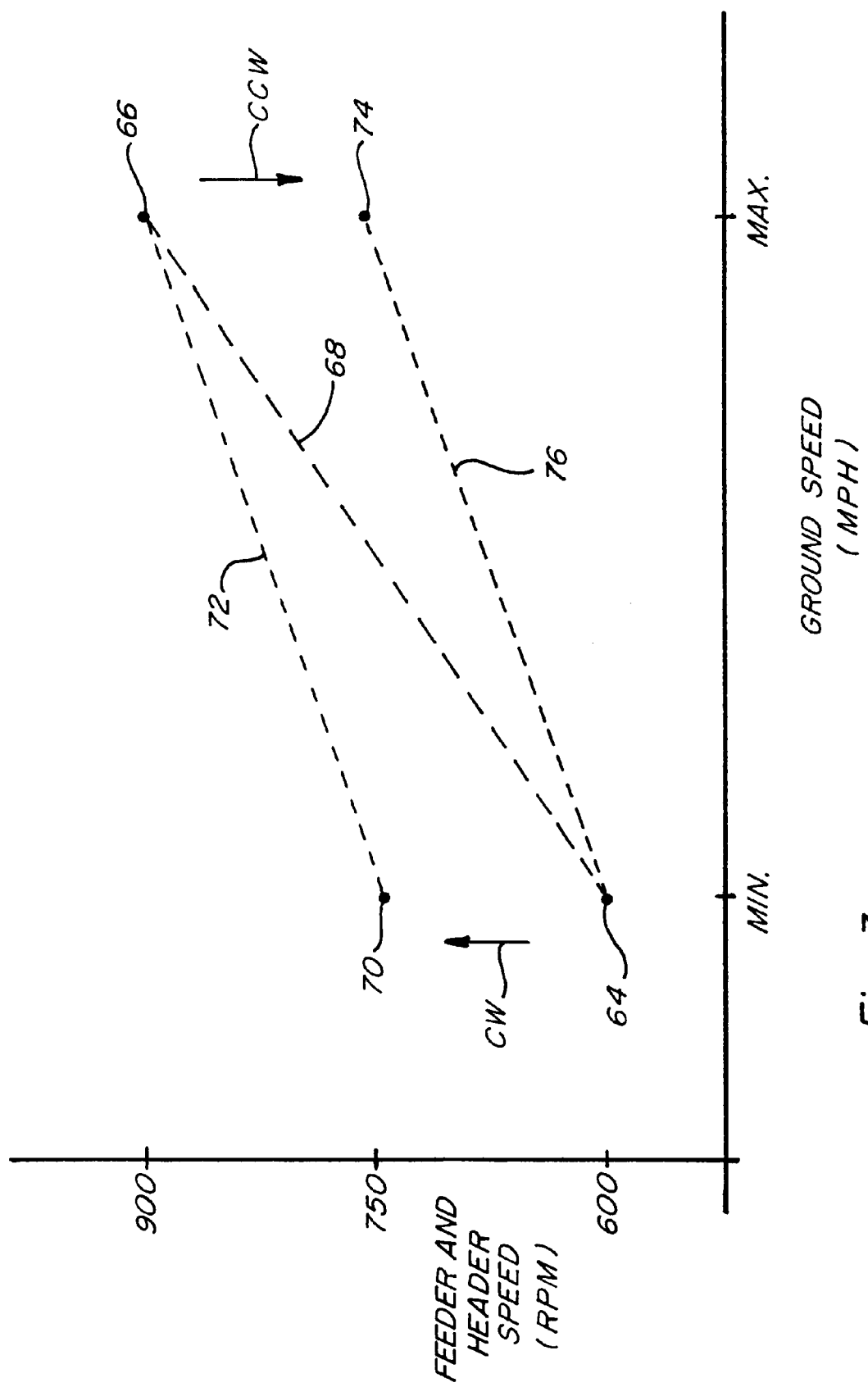
FIG. 3 is a graphical representation of feeder and header speed versus ground speed illustrating the capabilities of the present system.

Turning to FIG. 3, a graphical representation of feeder and header speed control by system 32 in revolutions per minute (RPM) versus ground speed of machine 10 in miles per hour (MPH), is shown. Under control of system 32, with knob 62 of device 36 in its center position as shown in FIG. 2, at a selected minimum ground speed, controller 58 will control the feeder and header speed at a predetermined value, as denoted at point 64. Similarly, at a designated maximum ground speed, with knob 62 at the center position, the feeder and header speed will be a predetermined RPM, as denoted at point 66. As the ground speed is increased through a range between the minimum and maximum speeds, the feeder and header speed will increase at a changing ratio to the ground speed denoted by line 68. When knob 62 is rotated in the clockwise direction, the feeder and header speed at the minimum designated ground speed will be proportionally increased, with a selectable maximum feeder and header speed at the minimum ground speed denoted at point 70, which represents the maximum clockwise rotation of knob 62. Using point 70 as an example, as the ground speed increases, the feeder and header speed will likewise increase at a changing ratio to ground speed, but at a rate of change which is lower than that represented by line 68, until the feeder and header speed reaches the predetermined maximum denoted at point 66 for the maximum ground speed, as denoted by line 72. Here, it should be noted that the slope of line 72 is less than that of line 68, which reflects a lesser rate of change of the ratio of feeder and header speed to ground speed as the ground speed increases from the minimum to the maximum value, both lines 68, 72 converging at point 66, such that, at the maximum ground speed, the feeder and header speed will be the same, regardless of the degree or amount of clockwise rotation of knob 62 from the center position. Here, it should also be recognized that when knob 62 is rotated to any position between the center position denoted at point 64 and the maximum clockwise position denoted at point 70, the feeder and header speed at the minimum ground speed will be increased according to the predetermined relationship to the degree of clockwise rotation, and the feeder and header speed will then increase at a changing ratio to the ground speed as the ground speed is increased which will follow a line which will fall between lines 68 and 72, terminating at point 66.

Similarly, when knob 62 is rotated fully in the counterclockwise direction, the feeder and header speed at the maximum ground speed will be decreased to an amount denoted by point 74 such that as the ground speed decreases to the minimum, the feeder and header speed will decrease to the level denoted at point 64, as represented by line 76. Again, the change in the ratio of the feeder and header speed to the ground speed is a function of the ground speed and the counterclockwise position of knob 62, the functional relationship changing as knob 62 is rotated in the counterclockwise direction such that the ratio or rate of change of the feeder and header speed relative to changes in the ground speed will decrease, as reflected by the differing slopes of line 68 wherein knob 62 is in the center position and line 76 wherein knob 62 is in the full counterclockwise position, the relationship being changeable infinitely between lines 68 and 76, such that a line representing the rate of change for a knob position between the center position and the full counterclockwise position will fall between lines 68 and 76.

As a simple example, if the selected minimum ground speed is 1.5 MPH and the selected maximum ground speed is 5.0 MPH, and it is desired to operate the feeder and header between about 600 RPM and about 900 RPM, which values would be selected based on the optimum operation of the feeder and header for a particular crop being harvested, with knob 62 in the center position as shown in FIG. 2, viewing the graph of FIG. 3, at the minimum ground speed of 1.5 MPH, the feeder and header would be driven at about 600 RPM (point 64), the ratio of the feeder and header speed to ground speed being calculated to be 600/1.5 or 400. At the maximum ground speed of 5 MPH the feeder and header would be driven at about 900 RPM (point 66), for a ratio of 900/5 or 180, the ratios of feeder and header speed to ground at ground speeds between the minimum and the maximum being a value between the 400 value and the 180 value depending on the ground speed. With knob 62 rotated to the full clockwise direction, at the minimum ground speed of 1.5 MPH the feeder and header speed will be about 750 RPM (point 70), for a ratio of 750/1.5 or 500, whereas at the maximum ground speed of 5 MPH the feeder and header speed will be about 900 RPM (point 66), for a ratio of 900/5 or 180, the ratio at ground speeds between the minimum and the maximum changing with the ground speed. Thus, by rotation of knob 62, an operator has a wide range of changing relationships of feeder and header speed to ground speed for a wide range of operating conditions and crop types.

It will be understood that changes in the details, materials, steps, and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

What is claimed is:

1. A system for controlling the speed of a feeder and header drive of a harvesting machine, comprising:
    a sensor for sensing a speed representative of a ground speed of the harvesting machine and outputting a ground speed signal representative thereof;
    a sensor for sensing a representative speed of the feeder and header drive and outputting a feeder and header speed signal representative thereof;
    a feeder and header speed control device connected to the feeder and header drive, the feeder and header speed control device being operable for receiving a speed control signal and increasing or decreasing the speed of the feeder and header drive based on the speed control signal;
    an operator input device for receiving an operator input and outputting an operator input signal representative thereof; and
    a controller for receiving the ground speed signal, the feeder speed signal, and the operator input signal and outputting a speed control signal to the feeder and header speed control device which will automatically vary a ratio of the speed of the feeder and header drive to the ground speed as a function of the operator input signal and changes in the ground speed.

2. The system of claim 1, wherein the controller will output a speed control signal to the feeder and header speed control device which will increase a rate of variation of the ratio of the speed of the feeder and header to the ground speed as the ground speed increases when a first operator input signal is received, and decrease a rate of variation of the ratio of the speed of the feeder and header to the ground speed as the ground speed increases when a second operator input signal is received.

3. The system of claim 2, wherein the operator input device comprises a potentiometer which will output the first operator output signal which will have a value within a first predetermined range when a shaft of the potentiometer is rotated in a first direction from a reference position and output the second operator output signal which will have a value within a second predetermined range when the potentiometer shaft is rotated in a second direction opposite the first direction from the reference position.

4. The system of claim 1, further comprising a second operator input device for receiving an operator input for allowing an operator to select a minimum ground speed value and a maximum ground speed value and outputting signals to the controller for setting a minimum ground speed and a maximum ground speed at which the ratio of the speed of the feeder and the header to the ground speed will be varied.

5. The system of claim 4, wherein the controller will control the speed of the feeder and header so as to remain above a minimum speed value when the ground speed is less than the minimum ground speed value and control the speed of the feeder and header so as to remain below a maximum speed value when the ground speed exceeds the maximum ground speed.

6. A variable feeder and header drive system for a harvesting machine, comprising:

a ground speed monitoring device;

is a feeder and header speed monitoring device;

an operator input device;

a feeder and header speed control device connected to the feeder and header drive and operable for increasing and decreasing the speed thereof; and a controller operable for receiving a ground speed input from the ground speed monitoring device, a feeder and header speed input from the feeder and header speed monitoring device and an operator input, and outputting a control signal to the feeder and header speed control device for automatically controlling the speed of the feeder and header in a varying proportional relationship to the ground speed input, wherein the controller will automatically vary the proportional relationship of the speed of the feeder and header drive to the ground speed as a function of the operator input.

* * * * *